(12) United States Patent
Morinaga et al.

(10) Patent No.: US 7,463,182 B1
(45) Date of Patent: Dec. 9, 2008

(54) RADAR APPARATUS

(75) Inventors: Mitsutoshi Morinaga, Kokubunji (JP); Toshiyuki Nagasaku, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 233 days.

(21) Appl. No.: 11/483,100

(22) Filed: Jul. 10, 2006

(30) Foreign Application Priority Data

Nov. 30, 2005 (JP) ............................. 2005-344956

(51) Int. Cl.
*G01S 13/42* (2006.01)

(52) U.S. Cl. ........................... 342/28; 342/70; 342/107; 342/109; 342/114; 342/133; 342/140; 342/146

(58) Field of Classification Search .................. 342/28, 342/107–109, 114, 115, 133, 139, 140, 146–148, 342/70–72

See application file for complete search history.

(56) References Cited

U.S. PATENT DOCUMENTS 6,404,506 B1 * 6/2002 Cheng et al. ................ 356/634
6,680,689 B1 * 1/2004 Zoratti ......................... 342/70
7,385,550 B2 * 6/2008 Winter et al. .................. 342/70
7,391,361 B2 * 6/2008 Kishida ....................... 342/109
7,394,355 B2 * 7/2008 Sjonell ........................ 340/435
7,417,584 B1 * 8/2008 Reifler et al. ................ 342/148
2008/0186223 A1* 8/2008 Mayer et al. ................ 342/107

FOREIGN PATENT DOCUMENTS

| JP | 11-183612 | 12/1997 |
| JP | 2000-338231 | 5/1999 |
| JP | 2002-236171 | 12/2001 |
| JP | 2004-239744 | 2/2003 |
| JP | 2007147532 A * | 6/2007 |

* cited by examiner

*Primary Examiner*—John B Sotomayor
(74) *Attorney, Agent, or Firm*—Reed Smith LLP; Stanley P. Fisher, Esq.; Juan Carlos A. Marquez, Esq.

(57) ABSTRACT

An inexpensive surveillance radar apparatus capable of identifying the kind of an object by using a monopulse radar that performs wide-angle two-dimensional surveillance. The radar apparatus receives reflected waves from a plurality of points on a moving object within a monitoring area, using a monopulse radar apparatus for measuring of angles, and determines the reflection point for each reflected wave, and then calculates the position and the width in the measuring angle of the surveillance radar of a moving object.

22 Claims, 14 Drawing Sheets

RADAR APPARATUS

CLAIM OF PRIORITY

The present application claims priority from Japanese application JP 2005-344956 filed on Nov. 30, 2005, the content of which is hereby incorporated by reference into this application.

FIELD OF THE INVENTION

The present invention relates a radar apparatus, and more specifically to a radar apparatus suitable for use in a surveillance radar apparatus that detects an object existing within a predetermined area and monitors the movement of the same.

BACKGROUND OF THE INVENTION

JP 2000-338231 A describes an art related to a radar apparatus that detects an intruding object by utilizing a radiowave such as microwave.

Also, JP 2002-236171 A discloses a radar system that detects an intruding object, and determines whether the intruding object is a human body or not, based on the radar cross section calculated from the signal power.

Further, JP 1999-183612 A describes a vehicle-mounted radar system, a signal processing circuit of which determines a distribution of the wave reflection points, and measures the position and width of a target based on the distribution.

Also, JP 2004-239744 A discloses a vehicle-mounted radar system that allows measurement of the width of a detected object.

SUMMARY OF THE INVENTION

As systems that monitor a predetermined indoor or outdoor area to detect an intruder, there are related systems using a camera or infrared ray. Systems using a visible camera, however, have lower reliability when used in impenetrable bad weather or at dark night. Those employing an infrared camera can be used any time day or night, but the infrared camera is expensive compared with the visible camera.

Also, there is an infrared-based sensor wherein a transmitter and a receiver are installed in a linear monitoring area and blocking of the infrared light to the receiver is detected, but this sensor had a problem that a flying object such as a leave and snow is erroneously detected.

To address these problems, there is provided a detection apparatus that employs, as a sensor, a radar which is less subject to surrounding environment, and measures the position and velocity of an intruding object. For example, the art of JP 2000-338231 A is to detect an intruding object by using radio waves including microwaves.

However, a related radar may erroneously detect a small animal, such as a dog or cat, intruding in the monitoring area as a human, and sound an alarm or make an emergency report. In order to prevent such false detection, it is necessary to distinguish between a small animal and a human. To distinguish them, the art of JP 2002-236171 A includes a human identification step in which the radar cross section of an intruding object is calculated based on signal power, and it is determined whether the intruding object is a human or not. Nevertheless, the radar cross section of a detected object is not always determined precisely in an actual environment, and it is difficult to determine a detected object to be a human with this information alone.

To cope with this problem, the width of a space occupied by a detected object is used as another information for distinguishing between a small animal and a human. For example, JP 1999-183612 A discloses a method of measuring the position and spatial width of a detected object. This art is to measure the width of a detected object in azimuth direction with a vehicle-mounted radar apparatus. In this art, the position and width in azimuth direction is calculated, by transmitting transmit waves with the radiation direction angle being displaced and measuring the distribution of the wave reflection points.

As for a radar apparatus disclosed in the JP 2004-239744 A, although a means for calculating the width of a detected object is referred to, what physical quantity is used and how to calculate the width are not shown specifically.

One solution to this problem is to measure the spatial width of an object detected in a monitoring area and use the measured value to identify the object. A related method of, for example, transmitting waves with the wave radiation direction angle being displaced in azimuth direction and measuring the width of a detected object in azimuth direction, as described in JP 1999-183612 A, will employ, for instance, the following two methods as azimuth displacement means: one is a method of mechanically rotating an antenna from which radio waves are emitted (a mechanical scan method) and the other is a method of controlling the phase of a signal that supplies power to the antenna elements of a flat antenna or the like to widely shift the composite waves (an electronic scan method).

If the mechanical scan method is employed, an electric-operated driver must be provided to rotate the antenna. Since this driver need to be composed of an electric motor, a drive transmission mechanism, a support member, and the like, the size and hence the cost of the sensor will inevitably increase.

On the other hand, if the electronic scan method is adopted, it is possible to shift the wave radiation direction by means of electronic control. This offers an advantage that the problems associated with the abovementioned mechanical rotation method will not occur. However, this method requires a mechanism to control the phase of a signal supplying power to the antenna element, and the cost will inevitably increase.

The present invention has been made to solve the above problems and an object thereof is to provide an inexpensive surveillance radar apparatus capable of accurately identifying the type of an object by using a monopulse radar that performs wide-angle two-dimensional monitoring.

In order to solve the abovementioned problems, the present invention uses a monopulse radar apparatus for measurement of azimuthal angle, which transmits radio waves simultaneously all over the monitoring area, receives the waves reflected from a moving object existing within the monitoring area, and measures a plurality of wave reflection points on the moving objects. Then, a scattering measure of the azimuthal position of the plurality of measured points is calculated, and the azimuthal spatial width of the moving object is calculated. Here, when standard deviation is used as a scattering measure, a value obtained by multiplying the tangent of the standard deviation with the distance to the moving object, and further multiplied with a predetermined proportional coefficient is output as the azimuthal width of the moving object.

Also, by referencing the past measurement values of azimuthal width and correcting and outputting azimuthal width currently measured, it is possible to obtain stable output values.

Based on the azimuthal width information obtained in this way, the kind of a detected object, for example a human or an automobile, is determined, and an action is taken as necessary, such as an alarm is given.

This configuration reduces the cost compared with when a radar apparatus radiating waves with radiation direction varied, and also reduces false alarms to increase the reliability.

According to the present invention, it is possible to provide an inexpensive surveillance radar capable of identifying the kind of a object, by using a monopulse radar that performs wide-angle two-dimensional surveillance.

DETAILED DESCRIPTION OF THE PREFERRED EMBODIMENTS

Now some embodiments of the present invention are described below with reference to FIGS. 1 through 16.

The embodiments described below are intended to detect a moving object within a monitoring area with a monopulse surveillance radar capable of wide-angle monitoring, and measure the spatial width of the object occupying in the angle-measuring direction of the radar.

First Embodiment

A first embodiment of the present invention is described below with reference to FIGS. 1 and 12.

Figure 1:
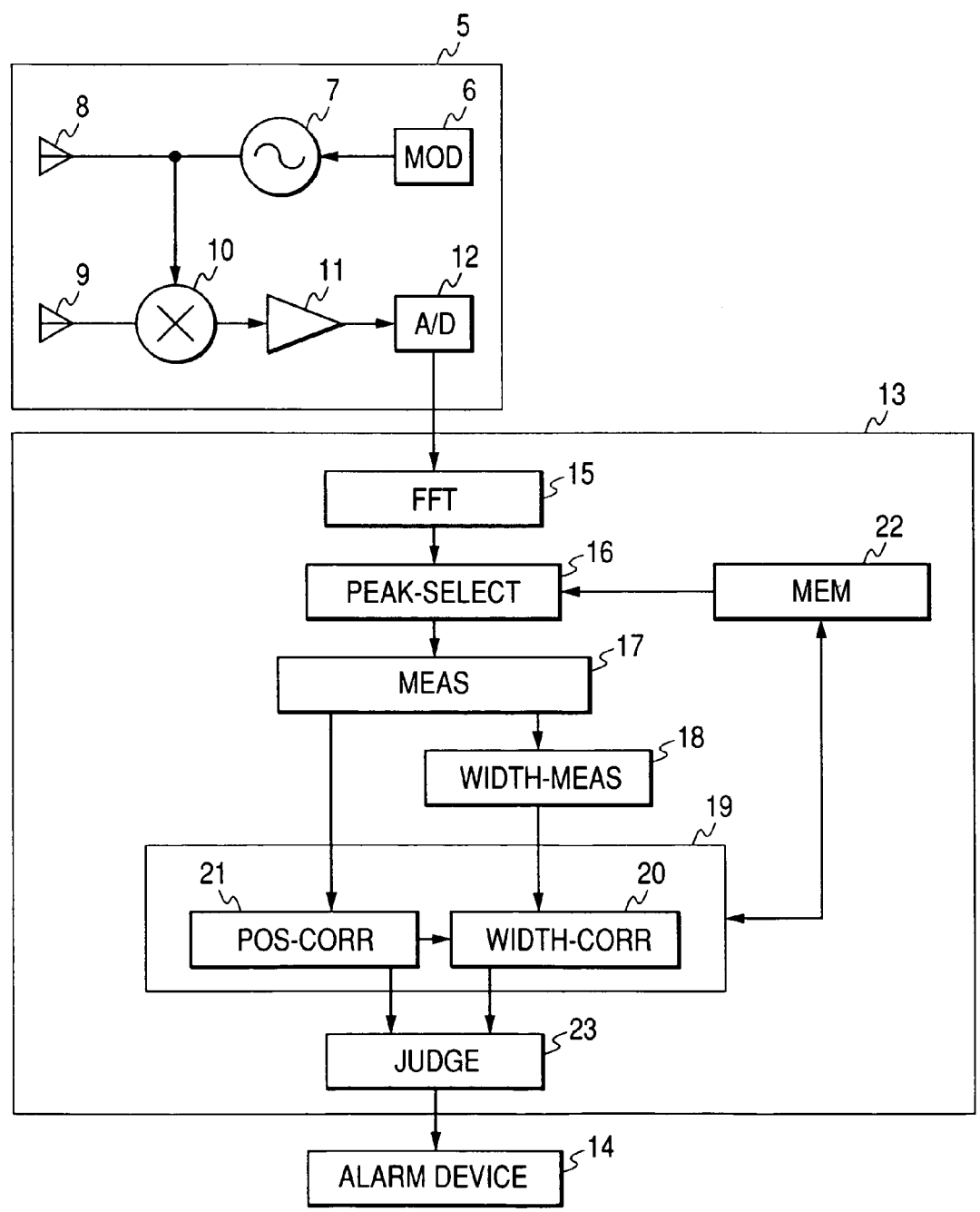
FIG. 1 is a block diagram illustrating the entire configuration of a surveillance radar apparatus of a first embodiment of the present invention.

First, a configuration and applications of the first embodiment of a surveillance radar of the present invention with reference to FIG. 1.

FIG. 1 is a block diagram illustrating the entire configuration of a surveillance radar of the first embodiment of the present invention.

Figure 2:
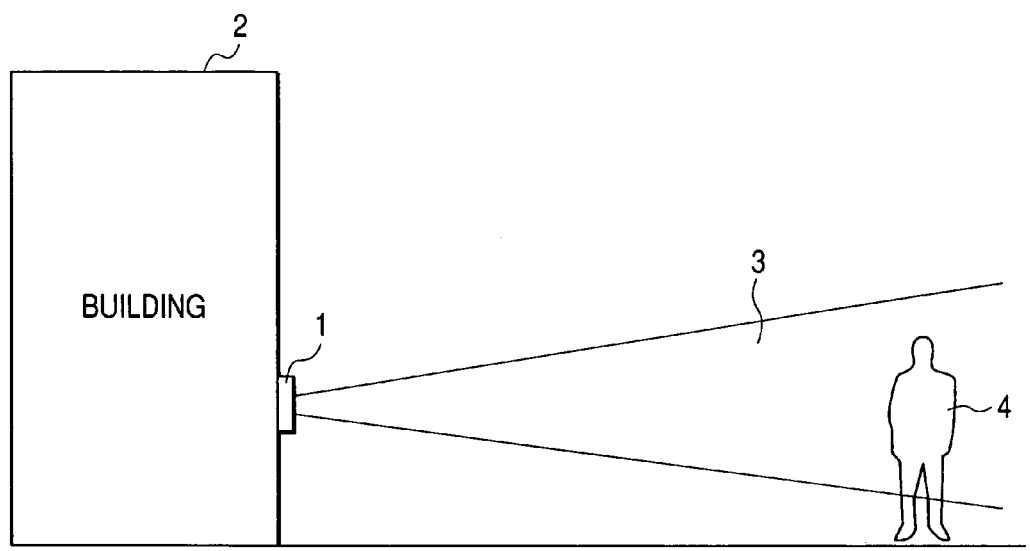
FIG. 2 is an example of a method of monitoring a prescribed area with a surveillance radar apparatus installed on an outside wall of a building.

FIG. 2 is a diagram showing how a predetermined area is monitored with a surveillance radar of the first embodiment of the present invention that is installed on an outside wall of a building.

As shown in FIG. 2, a surveillance radar 1 of the present invention is applicable to an intrusion detection system for office buildings and residences. The surveillance radar apparatus 1 is installed, for example, on an outside wall of a building 2, and detects a moving object like a human intruding into a radio emission area 3. The surveillance radar apparatus 1 uses radio waves and has an advantage that an intruding object can be detected without fail even when visibility is low due to rain, fog, snow, or the like. Here, a radar used in the surveillance radar apparatus 1 includes, for example, a 24 GHz band radar and a 76 GHz band radar.

The surveillance radar apparatus 1 comprises an analogue circuit 5, a signal processing circuit 13, and an alarm device 14, as shown in FIG. 1.

The analogue circuit 5 of the surveillance radar apparatus 1 is provided with a transmission system including a modulator 6, an oscillator 7, and a transmitting antenna 8, and a receive system including a receiving antenna 9, a mixer 10, an amplifier 11, and an A/D converter 12.

The signal processing circuit 13 is a circuit that processes a signal input from the A/D converter 12 in the analogue circuit and identifies a detected object, and contains an FFT processing unit 15, a peak extract unit 16, a detected object measuring unit 17, a width calculation unit 18, a detected object tracking unit 19, a memory unit 22, and a detected object identify unit 23. Also, the detected object tracking unit 19 has a width correction unit 20 and a position correction unit 21.

The alarm device 14 is a device that receives an output from the signal processing circuit 13 when a detected object is identified as an intruder, and gives an alarm.

Next, the operation of a surveillance radar apparatus of this embodiment is described taking theoretical background of the radar into consideration, with reference to FIGS. 1, 3 through 12.

Figure 3:
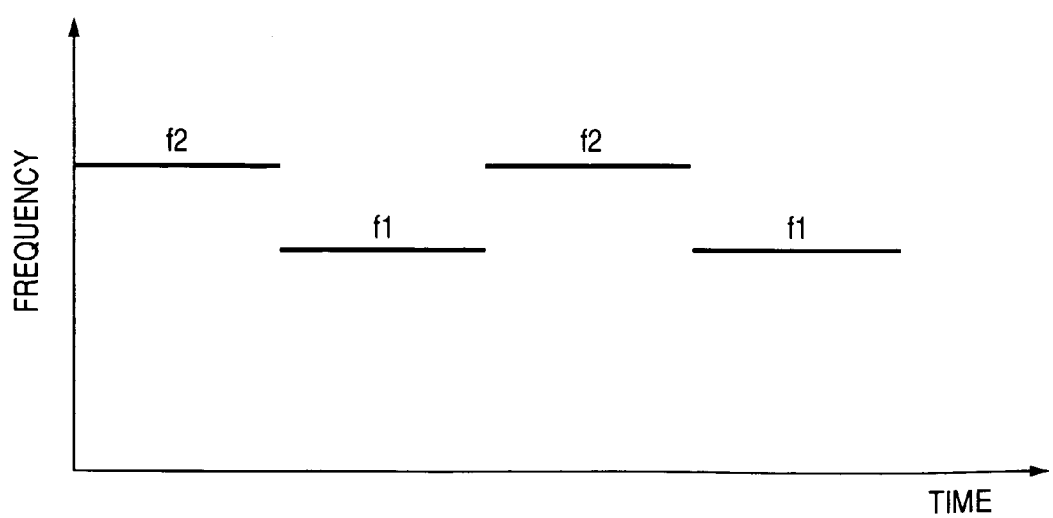
FIG. 3 is a graph for explaining a modulation by two-frequency CW modulation technique.

FIG. 3 is a graph for explaining a modulation method for the two-frequency CW modulation technique.

Figure 4:
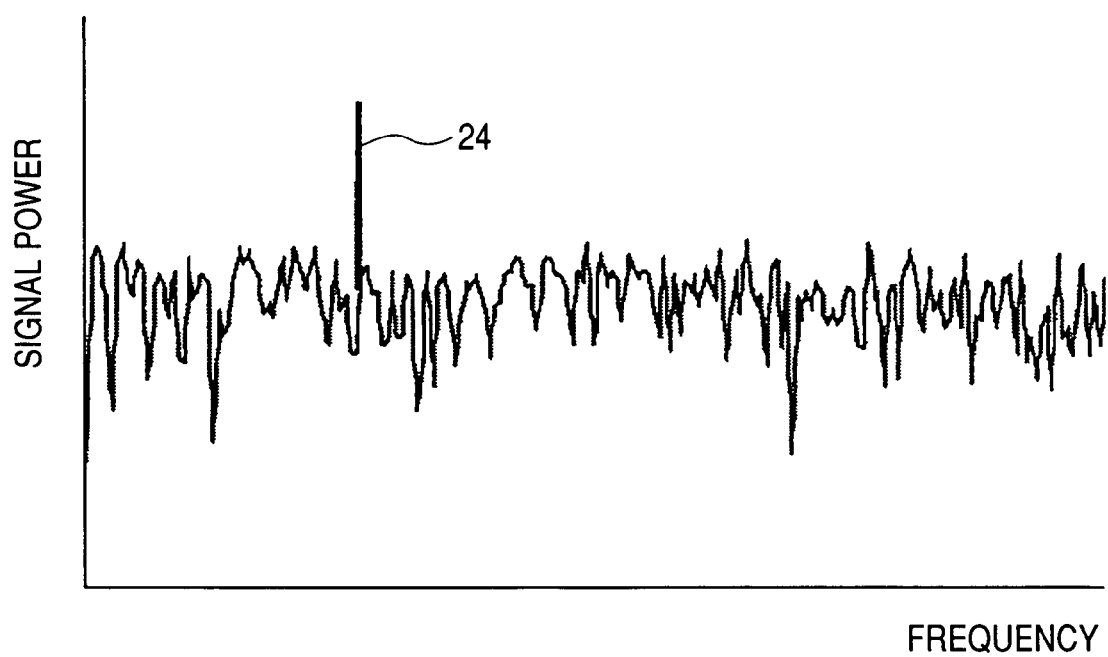
FIG. 4 is a frequency spectrum diagram showing that a Doppler frequency, caused by the reflection of a transmitted wave from a moving object, is observed as a peak.
Figure 5:
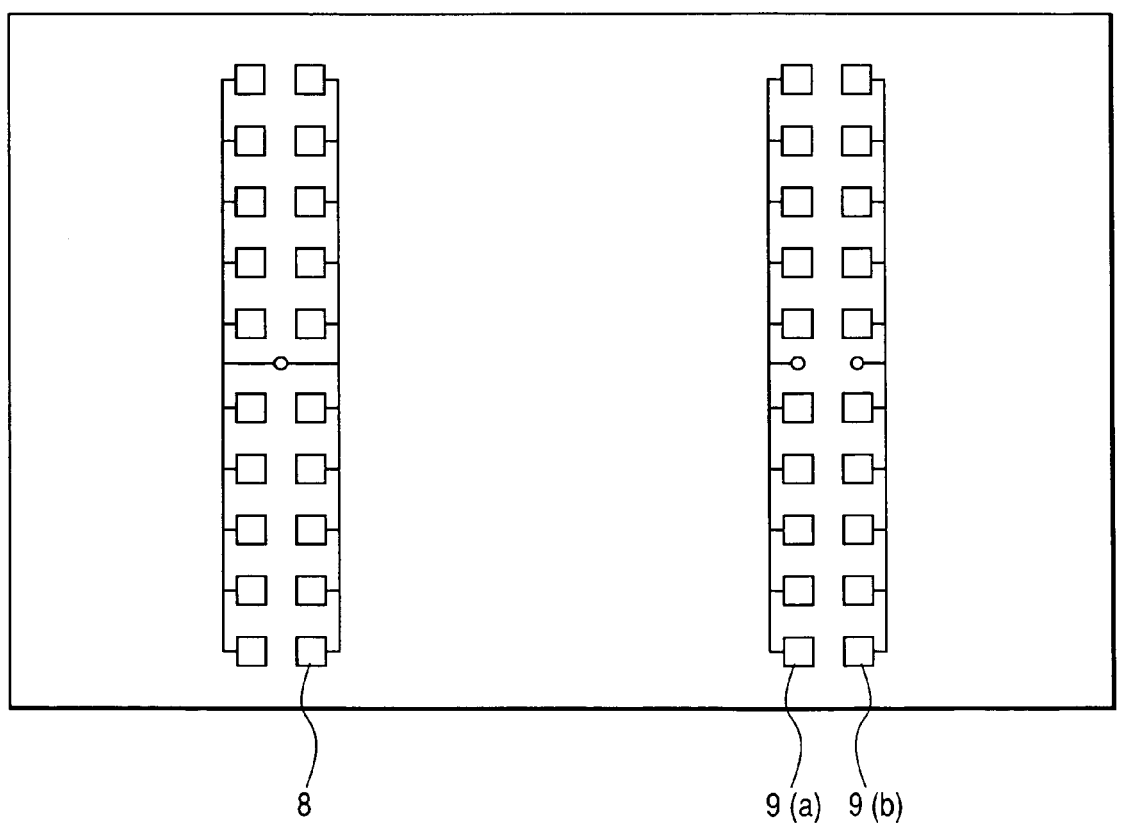
FIG. 5 is a diagram showing an exemplary antenna configuration when the monopulse angle measuring techniques is implemented using patch antennas.
Figure 6:
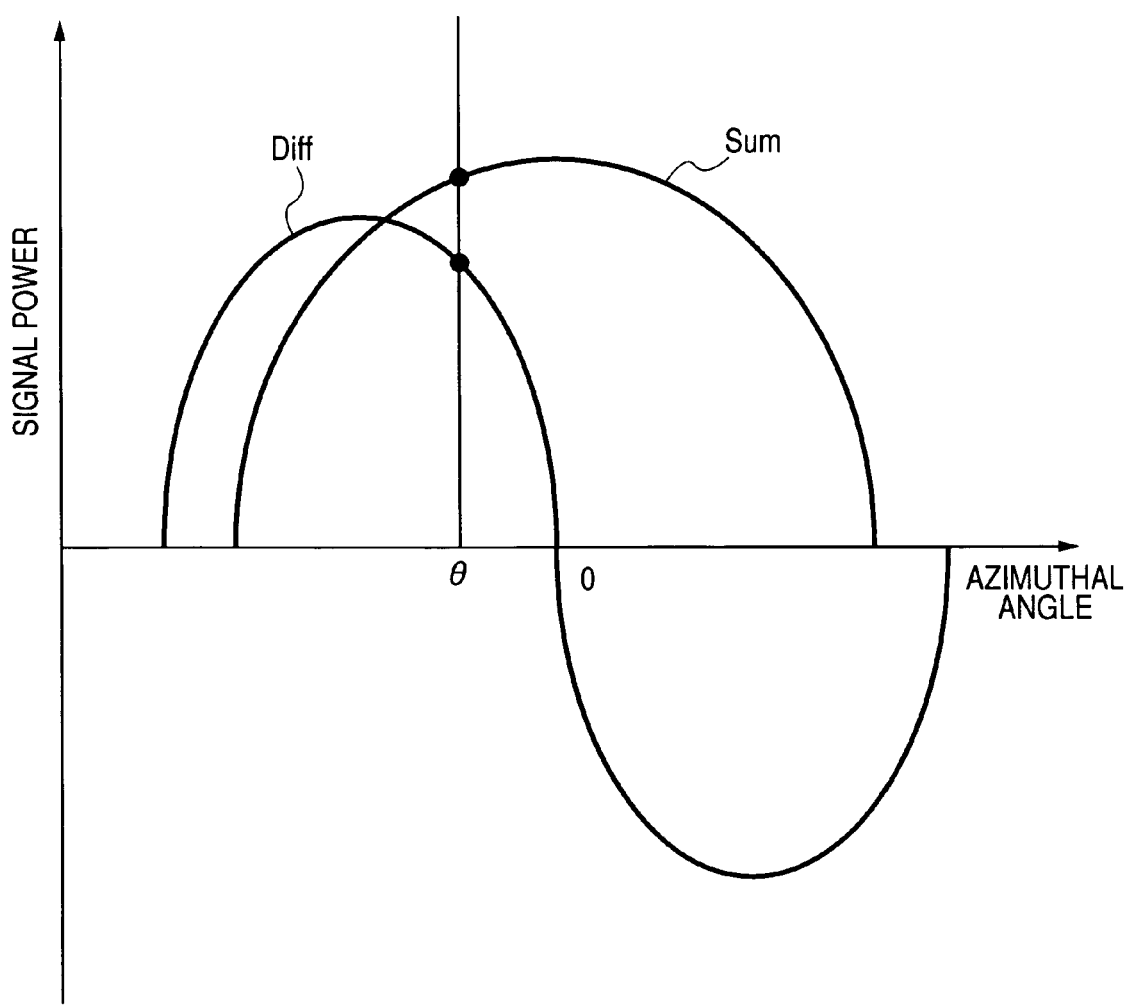
FIG. 6 is a diagram showing the dependence on azimuthal angle of the sum and difference signals of signals received by two antennas implementing the monopulse angle measuring techniques.
Figure 7:
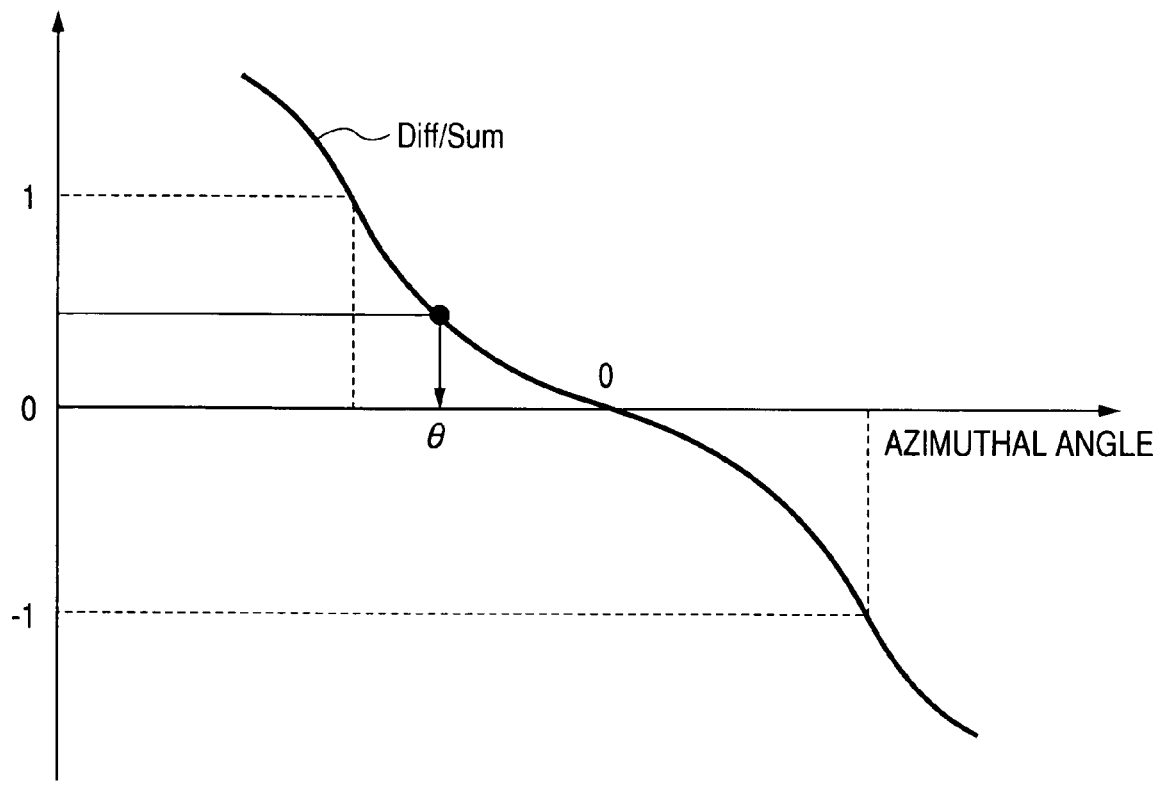
FIG. 7 is a graph for explaining the azimuthal angle measuring principle of the monopulse angle measuring techniques.
Figure 8:
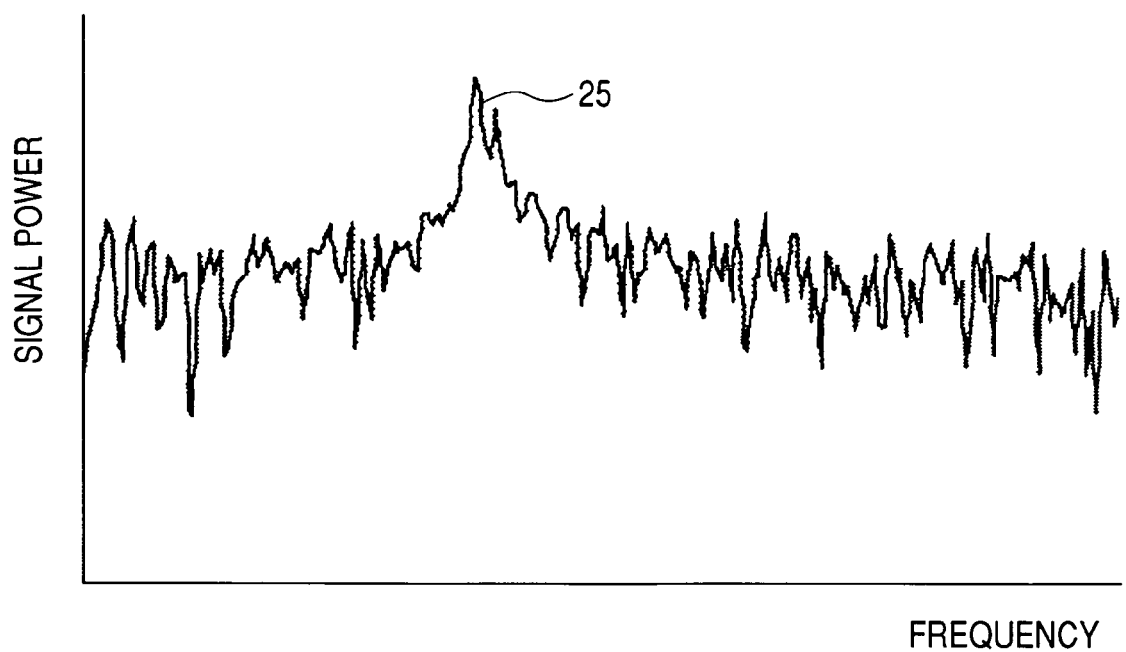
FIG. 8 is a frequency spectrum diagram showing that a peak, caused by a Doppler frequency resulting from the reflection of a transmitted wave by a moving object, is observed with frequency width.
Figure 9:
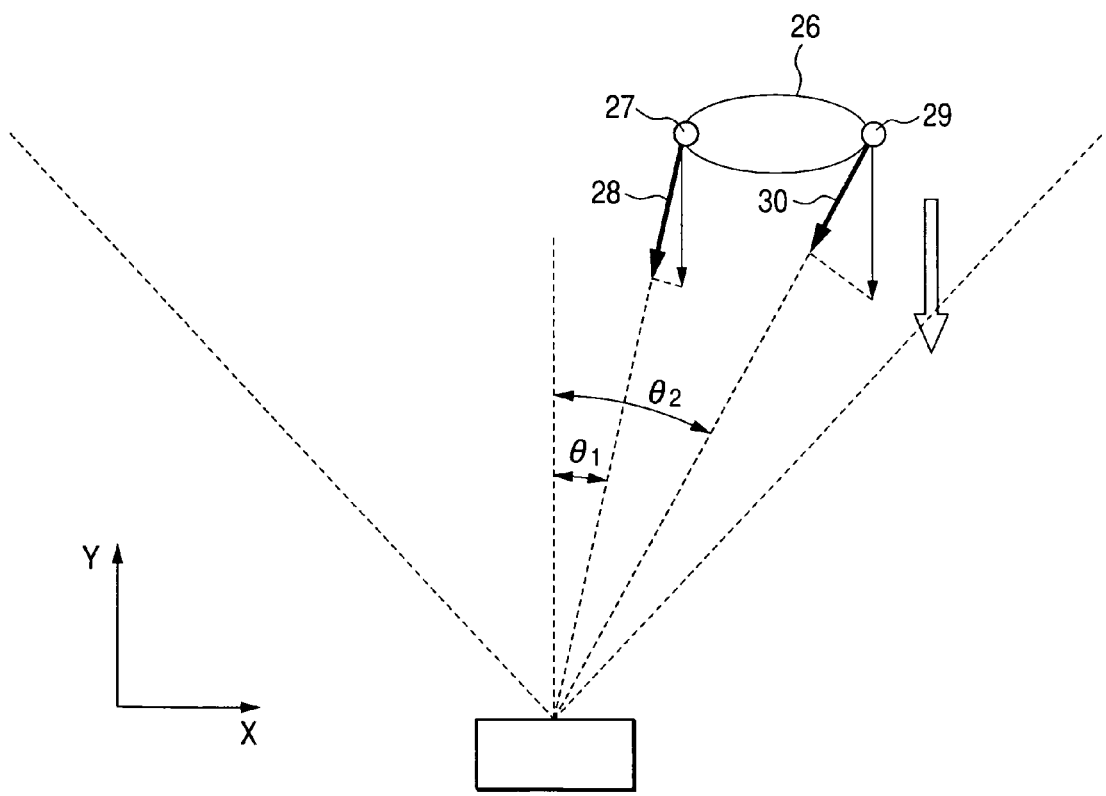
FIG. 9 is a diagram illustrating that the velocity of a moving object relative to the radar varies depending on the location of the object moving within the monitoring area.
Figure 10:
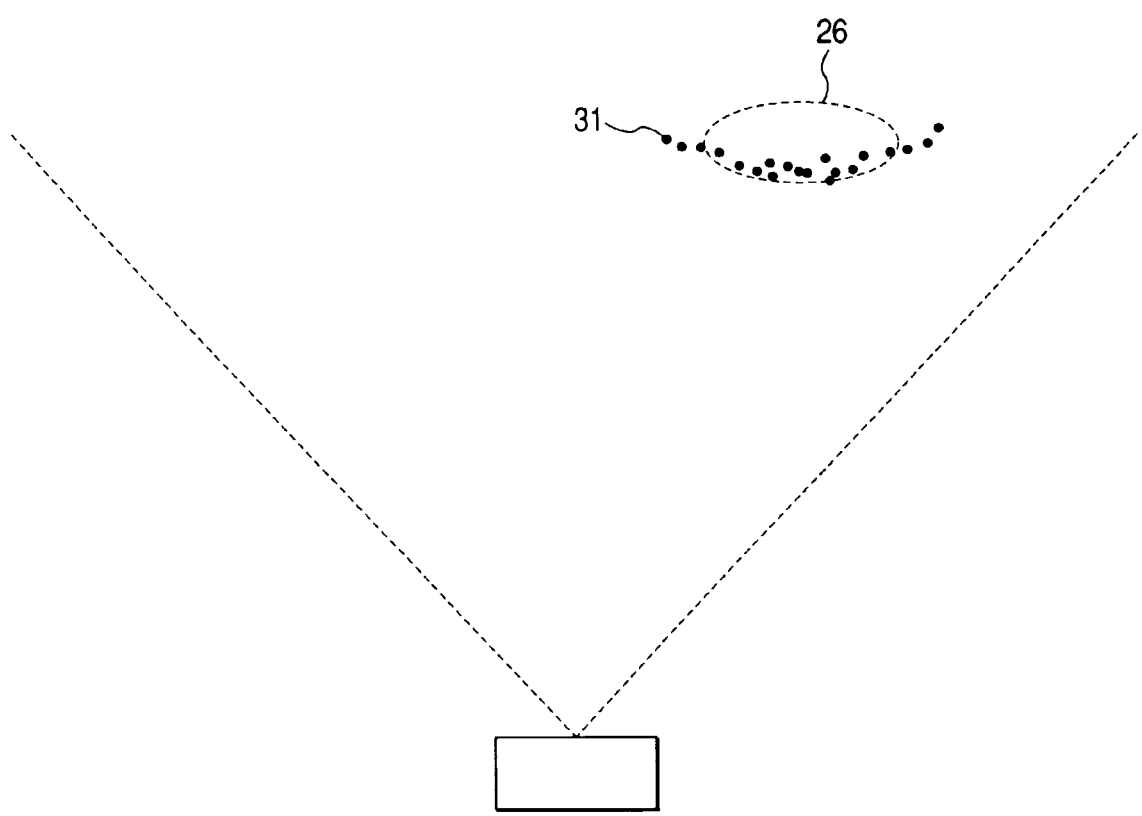
FIG. 10 is a diagram showing how a plurality of reflection points on a moving object in the monitoring area are measured.
Figure 11:
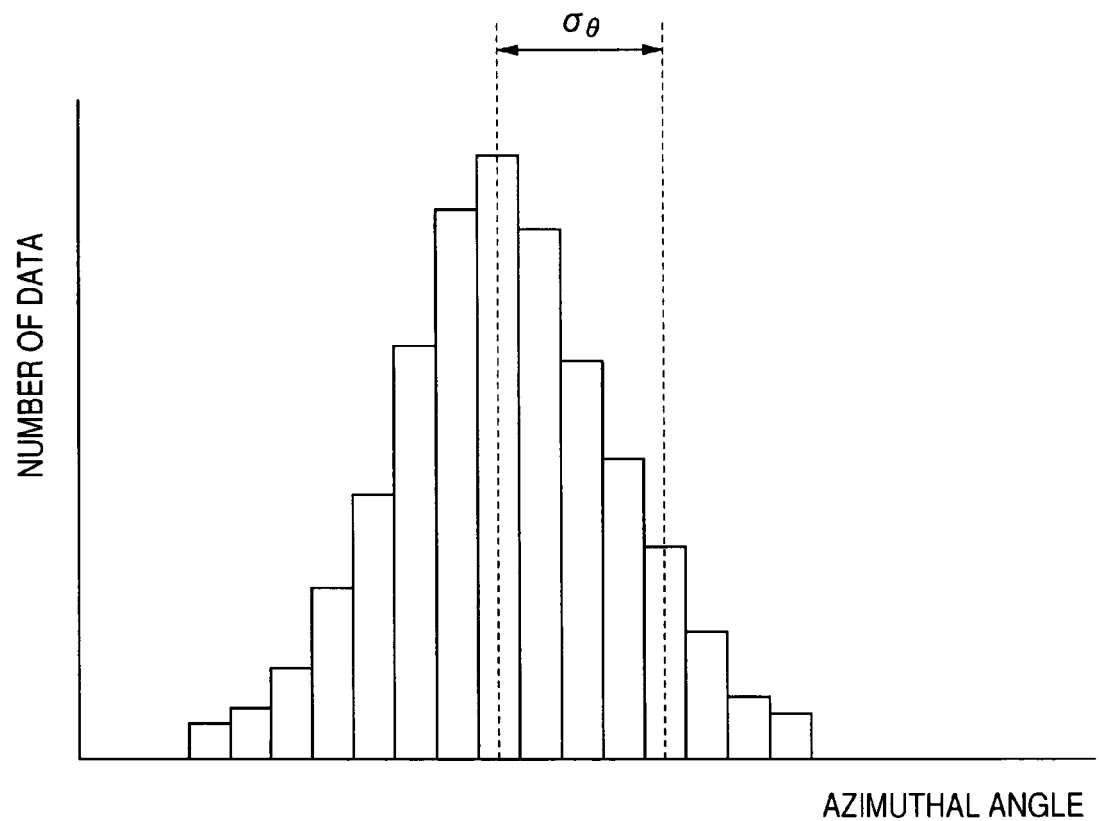
FIG. 11 is a histogram showing a distribution of a plurality of reflection points on a moving object in the monitoring area, when they were measured.
Figure 12:
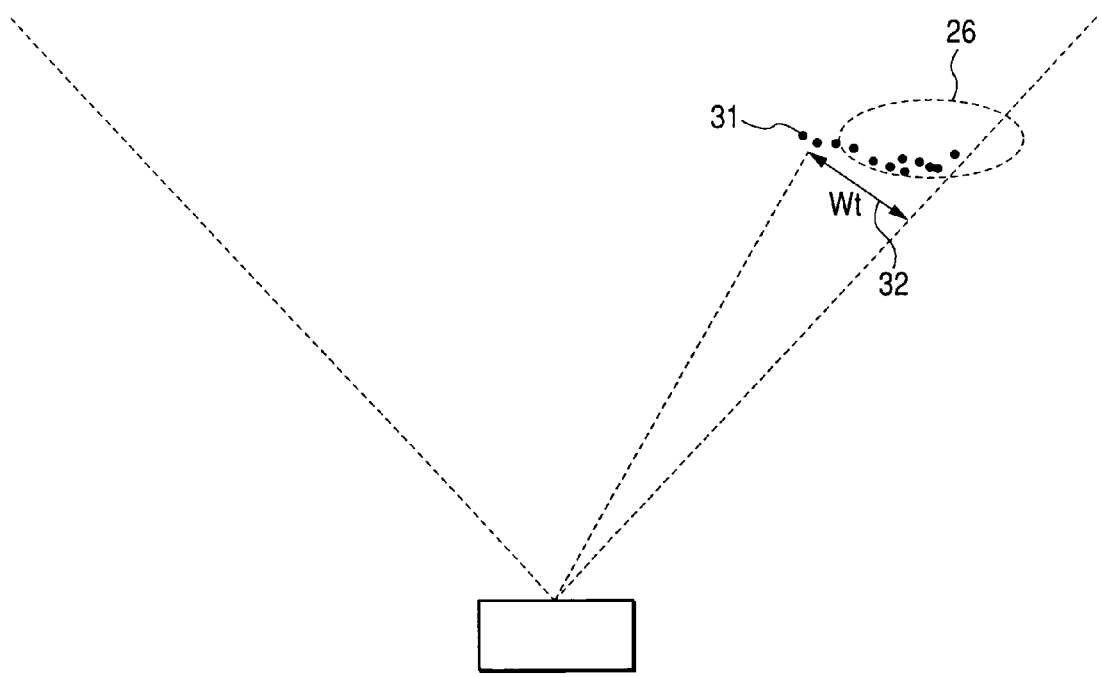
FIG. 12 is a diagram showing how a plurality of reflection points on a moving object are measured that was detected at a location extending over the detectable and undetectable areas.

FIG. 4 is a frequency spectrum diagram showing that a Doppler frequency, caused by the reflection of a transmitted wave from a moving object, is observed as a peak;

FIG. 5 is a diagram showing an exemplary antenna configuration when the monopulse angle measuring techniques is implemented using patch antennas;

FIG. 6 is a diagram showing the dependence on azimuthal angle of the sum and difference signals of signals received by two antennas implementing the monopulse angle measuring techniques;

FIG. 7 is a graph for explaining the azimuthal angle measuring principle of the monopulse angle measuring techniques;

FIG. 8 is a frequency spectrum diagram showing that a peak, caused by a Doppler frequency resulting from the reflection of a transmitted wave by a moving object, is observed with frequency width;

FIG. 9 is a diagram illustrating that the velocity of a moving object relative to the radar varies depending on the location of the object moving within the monitoring area;

FIG. 10 is a diagram showing how a plurality of reflection points on a moving object in the monitoring area are measured;

FIG. 11 is a histogram showing a distribution of a plurality of reflection points on a moving object in the monitoring area, when they were measured;

FIG. 12 is a diagram showing how a plurality of reflection points on a moving object are measured that was detected at a location extending over the detectable and undetectable areas;

The oscillator 7 in the analogue circuit 5 performs an oscillation at a frequency based on a modulation signal from the modulator 6, and the high frequency signal is radiated from the transmitting antenna 8 to a monitoring area, as a transmit radiowave.

Now, the principle of detection of a moving object by the surveillance radar 1, namely, the principle of measurement of the distance to a detected object and moving velocity of the same is described, for the case where the two-frequency continuous wave (CW) modulation technique is adopted.

In a two-frequency CW modulation technique radar, a modulation signal is input to the oscillator 7 and radio waves are transmitted with the frequency temporally switched between two frequencies f1 and f2 as shown in FIG. 3. A radiowave transmitted from the transmitting antenna 8 is reflected by an object within the radiation area, and the reflected radio signal is received by the receiving antenna 9. This received signal is mixed with the transmitted signal in the mixer circuit 10 to produce an intermediate frequency, which is output to the amplifier 11. The signal amplified by and output from the amplifier 11 is converted to a digital signal by the A/D converter 12, and sent to the signal processing circuit 13. Then, a frequency spectrum is determined by the FFT processing unit 15 in the signal processing circuit 13 that performs a fast Fourier transform. The signal reflected back from a moving object within a detection area has a frequency different from the transmit frequency due to the influence of Doppler effect, and therefore, when frequency spectrum is determined, a peak 24 is observed in the frequency corresponding to the moving velocity of an object, as shown in FIG. 4. In the memory unit provided in the signal processing circuit 13, a frequency spectrum determined when no moving object is present within a detection area is pre-stored, this frequency spectrum being called a noise spectrum.

A frequency spectrum is determined in sequence periodically under surveillance condition, and compared with a noise spectrum in the peak extract unit 16 to calculate the signal noise ratio (S/N). Here, S/N is high means a peak is high, and hence the receive intensity of a radiowave reflected by a moving object is high.

Next, in the detected object measuring unit 17, a relative velocity (v) to a radar at the reflection point is calculated by the following equation (equation 1), with respect to a peak with high S/N.

$$v = \frac{c \times f_d}{2f} \quad (1)$$

where c is light velocity, $f_d$ Doppler frequency, f oscillating frequency.

Also, the detected object measuring unit 17 measures the phase of each of transmit frequencies f1 and f2 for the above signal peak, and calculates the range from a phase difference Φ by equation 2, based on the principle of the two-frequency CW modulation technique.

$$\text{Range} = \frac{c \times \Phi}{4\pi \times \Delta f} \quad (2)$$

where Δf=f2−f1.

Now, a method of calculating azimuthal position is described, which is calculated by the detected object measuring unit 17. First, FIG. 5 shows an exemplary configuration of antennas. Each antenna is composed of patch antennas, and a receiving antenna is composed of two channels such as 9a and 9b. The azimuth dependent intensity of the sum signal (Sum) of the powers received by the two antennas and that of the difference signal (Diff) are as shown in FIG. 6, and its ratio calculated is as shown in FIG. 7. Note that, in the definition of azimuth angle θ, the front direction of a radar is defined as θ=0, the open angle in right direction as positive (+), and that in left direction as negative (−).

Here, this azimuth dependency is pre-measured for each radar and stored in the memory unit 22. If a peak with high S/N is detected, the azimuthal coordinate (θ) of the reflection point is identified, by measuring the power ratio and phase difference between Sum and Diff and referencing the azimuth dependency data stored in the memory unit 22.

Described above is a procedure for measuring the azimuthal position from the place where a radar is installed.

In an actual frequency spectrum, however, a single sharp peak like the peak 24 seldom exists, and a wide peak like the peak 25 as shown in FIG. 8 is observed.

This is described with reference to FIG. 9. Since an object detected within a monitoring area has naturally a spatial width, the relative velocity of the object to a radar differs with a reflection point on the object. For example, for an object 26 moving at velocity V in the negative direction on y-coordinate, the relative velocity of the reflection point 27 to the radar is V cos $θ_1$ indicated by an arrow 28, whereas that of a reflection point 29 is V cos $θ_2$ indicated by an arrow 30. In such a case, if a frequency spectrum is determined, a peak will be observed on a different frequency. However, since the object is actually a continuum and the relative velocity to the radar is continuously varying, and since a signal leakage called a side lobe exists outside of the actual Doppler frequency as a nature of the FFT processing, peaks caused by the signals reflected from various points on a detected object are observed in an overlapped form, and a wide peak like the peak 25 in FIG. 8 is obtained. Furthermore, in the case of an object with arms and legs moving discretely like a human, the moving velocity of each member differs and thus this tendency becomes stronger.

So, a method of extracting a Doppler frequency, at which the distance and azimuth is measured, from such a peak with a wide frequency is described below.

First, it is a general fact that higher the S/N smaller the influence of noises, and therefore the distance to a reflection point and azimuthal position can be accurately measured. This is true of a wide peak like the peak 25, and the position and azimuthal position determined from a frequency with high S/N allows a reflection point to be accurately calculated. Conversely, the position and azimuthal position is measured for a frequency with low S/N, the influence of noises is not negligible and the measurement accuracy is lower and the positional error is larger. In this embodiment, an S/N threshold level is set and stored in the memory unit 22 in advance for extracting a frequency at which the distance and azimuth is measured. At this time, however, if positional accuracy is prioritized and a too large S/N threshold level is set, an object with a small radar cross section and a low intensity reflection point cannot be detected, and therefore an S/N threshold level should be set that satisfies desired detection requirement and positional accuracy.

Assume that the number of frequencies with larger than this S/N threshold level is, for example, n. For these n frequencies, measuring processing is performed by the detected object measuring unit 17 to calculate distance $R_i$ (I=1, 2, ..., n), azimuth $\theta_i$ (I=1, 2, ..., n), and S/N value $SN_i$ (i=1, 2, ..., n). Then, when these are converted into the XY coordinate by performing $X_i = R_i \times \sin\theta_i$ and $Y_i = R_i \times \cos\theta_i$, and calculated positions are indicated on the X-Y coordinate, the measured data are distributed within the area on the radar front side where detected objects 26 exist and surrounding area, like a data point 31 in FIG. 10. The width calculation unit 18 calculates the azimuthal spatial width of a detected object from the distribution of data points determined in this way. This processing by the width calculation unit 18 is described below.

If a histogram is plotted for the azimuthal positions of determined data points like the data point 31 in FIG. 10, it becomes as shown in FIG. 11. Then, if standard deviation $\sigma_\theta$ is used as a scattering measure in azimuthal direction, the azimuthal width W of a detected object is calculated by the following equation 3.

$$W = A \times R \times \tan(\sigma_\theta) \tag{3}$$

where coefficient A is a constant for converting $\sigma_\theta$ to an actual width. This value is determined by the following equation 4 as the ratio to $\tan(\sigma_\theta)$ calculated upon detection of an object whose width ($W_{known}$) and distant to the radar ($R_{known}$) is known, and stored in the memory unit 22 in advance.

$$A = W_{known}/(R_{known} \times \tan(\sigma_\theta)) \tag{4}$$

R in the equation 3 is a representative value of the distance to a reflection point and a value determined from the following equation 5 by the detected object measuring unit 17.

$$R = R_i \times SN_i/\Sigma SN_i \tag{5}$$

That is, R represents a gravity point of the measured distances of a plurality of reflection points, with respect to S/N. Also, representative values of the velocity and azimuthal coordinate of detected objects should be determined by the following equations 6 and 7, in the detected object measuring unit 17.

$$V = V_i \times SN_i/\Sigma SN_i \tag{6}$$

$$\theta = \theta_i \times SN_i/\Sigma SN_i \tag{7}$$

The distance R, velocity V, and azimuthal coordinate $\theta$ are input to the positional correction unit 21 provided in the detected object track unit 19, and the width W in azimuthal direction is input to the width correction unit 20. In the positional correction unit 21, currently calculated actual information is corrected based on the current measurement information to be predicted from the past detected object measurement information stored in the memory unit 22. For this correction unit, a Kalman filter, an $\alpha$-$\beta$-$\gamma$ filter, or the like is employed that has been used in the radar technology field.

Also, the width correction unit 20 performs the following processing. First, the azimuthal width to be input to the width correction unit is expressed as $W_m$, and the azimuthal width to be corrected by and output from the width correction unit 20 is expressed as $W'_m$, where the subscript m is an indicator of time, and the value decreases as it becomes older. In the width correction unit 20, calculated values are corrected according to the following equation 8.

$$W'_m = W_m + \alpha(W'_{m-1} - W_m) \tag{8}$$

where $\alpha$ is a constant between 0 and 1, and $W'_m$ is affected by the past measurement information as $\alpha$ increases. The equation 8 acts as a low-pass filter, and therefore another filtering method may be substituted for the equation 8 as long as it serves as a low-pass filter. Through the above processing, calculated values varying with time can be smoothed and thereby stable values can be output.

Furthermore, the width correction unit 20 also calculates the azimuthal coordinates at which both ends of a detected object are positioned. When the distance to a detected object, which is an output of the positional correction unit 21, is expressed as $R_t$, azimuthal position as $\theta_t$, and a value obtained through the above width correction processing as $W_t$, the leftmost azimuthal coordinate $\theta_{left}$ is calculated by the following equation 9, and the rightmost azimuthal coordinate $\theta_{right}$ is calculated by the equation 10.

$$\theta_{left} = \theta_t - \arctan(W_t/(2R_t)) \tag{9}$$

$$\theta_{right} = \theta_t + \arctan(W_t/(2R_t)) \tag{10}$$

where arctan is an inverse function of the tangent of a trigonometric function.

If a detected object is located in the vicinity of the border between a detectable azimuthal area and an undetectable azimuthal area as shown in FIG. 12, only a portion of the object may be detected. Therefore, if at least one of the $\theta_{left}$ and $\theta_{right}$ is located, for example, within ±1 degree of the border, then the width correction unit 20 also outputs the information indicating that the $W_t$ measured as a spatial width in azimuthal direction is a lower limit value of the spatial width in azimuthal direction of the detected object.

The moving velocity, distance, azimuthal position, and azimuthal width of the detected object determined in this way are input to the detected object identify unit 23. In the detected object identify unit 23, when the detected object is located within a monitoring area, if the azimuthal width of the object is within possible values for a human, for example between 40 cm and 100 cm, the object is judged to be a human and a measure, such as reporting to the security firm through the alarm device 14, is taken.

The surveillance radar apparatus of the present invention is applicable not only to the outdoor monitoring for intruders but also to monitoring the indoor human movements. For example, it is possible to install on an inside wall of a house and track the positions of dweller(s) of the house by distinguishing the dweller from other moving object(s), such as a cat or other pets.

As described above, a surveillance radar apparatus of the present invention employs the monopulse angle measuring techniques requiring no angular displacement of radiated waves for measuring the spatial width in azimuthal direction of a detected object, and allow the kind of a detected object to be identified based on the information on the width thereof. This reduces the cost compared with a radar requiring angular displacement of radiated waves and also reduces false alarms to improve the reliability.

Since a surveillance radar of this embodiment is capable of judging whether a detected moving object is human or not, using this radar for crime prevention purpose makes it possible to prevent any intrusion.

Second Embodiment

Now, a second embodiment of the present invention is described below with reference to FIG. 13.

Figure 13:
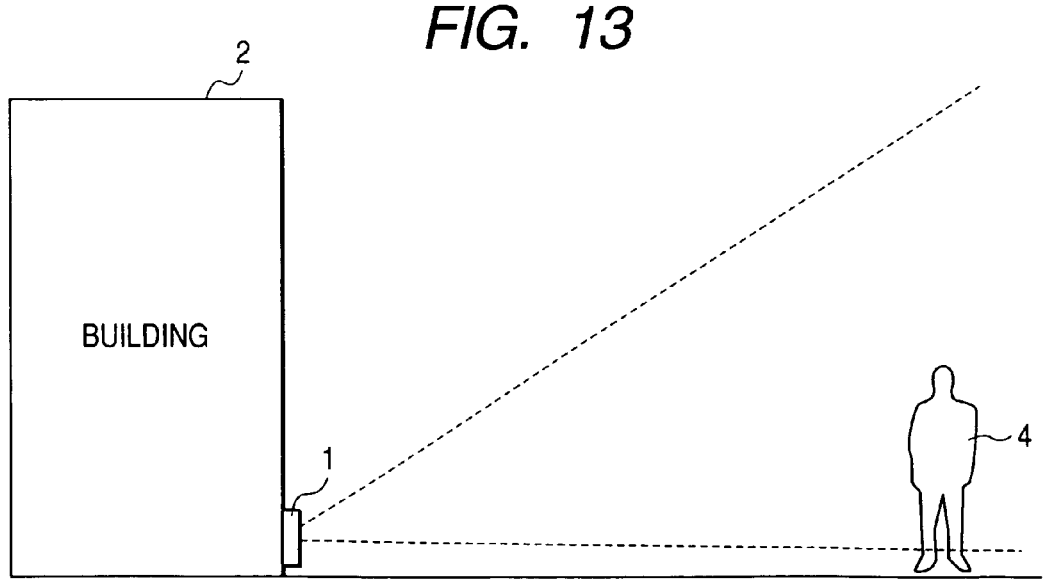
FIG. 13 is a diagram showing a surveillance radar of the present invention that is installed so that its angle-measuring direction is in vertical direction.

FIG. 13 is a diagram showing an example of installing a surveillance radar apparatus so that its angle measuring direction is in vertical direction.

In other words, this is an example of installing the radar apparatus with the antenna face shown in FIG. 5 of the first embodiment turned 90 degrees Installing in this way makes it possible to measure the vertical width instead of the azimuthal width determined in the first embodiment. That is, the height of a detected object can be measured. Accordingly, if the vertical width of a detected object is within the possible values for a human, such as between 1 m and 2.5 m, the detected object identify unit 23 judges that a human walking upright is intruding, and actuates the alarm device 14 based on the judgment.

Also, using a surveillance radar apparatus of the first embodiment and that of this embodiment simultaneously allows both the azimuthal width (lateral width) and the vertical width (height) to be measured simultaneously.

If a surveillance radar of this embodiment is used for crime prevention purpose, it is possible to increase the accuracy in judging whether a detected object is a human or not, which is effective for preventing intrusion.

Third Embodiment

Now, a third embodiment of the present invention is described with reference to FIGS. 14 through 16.

Figure 14:
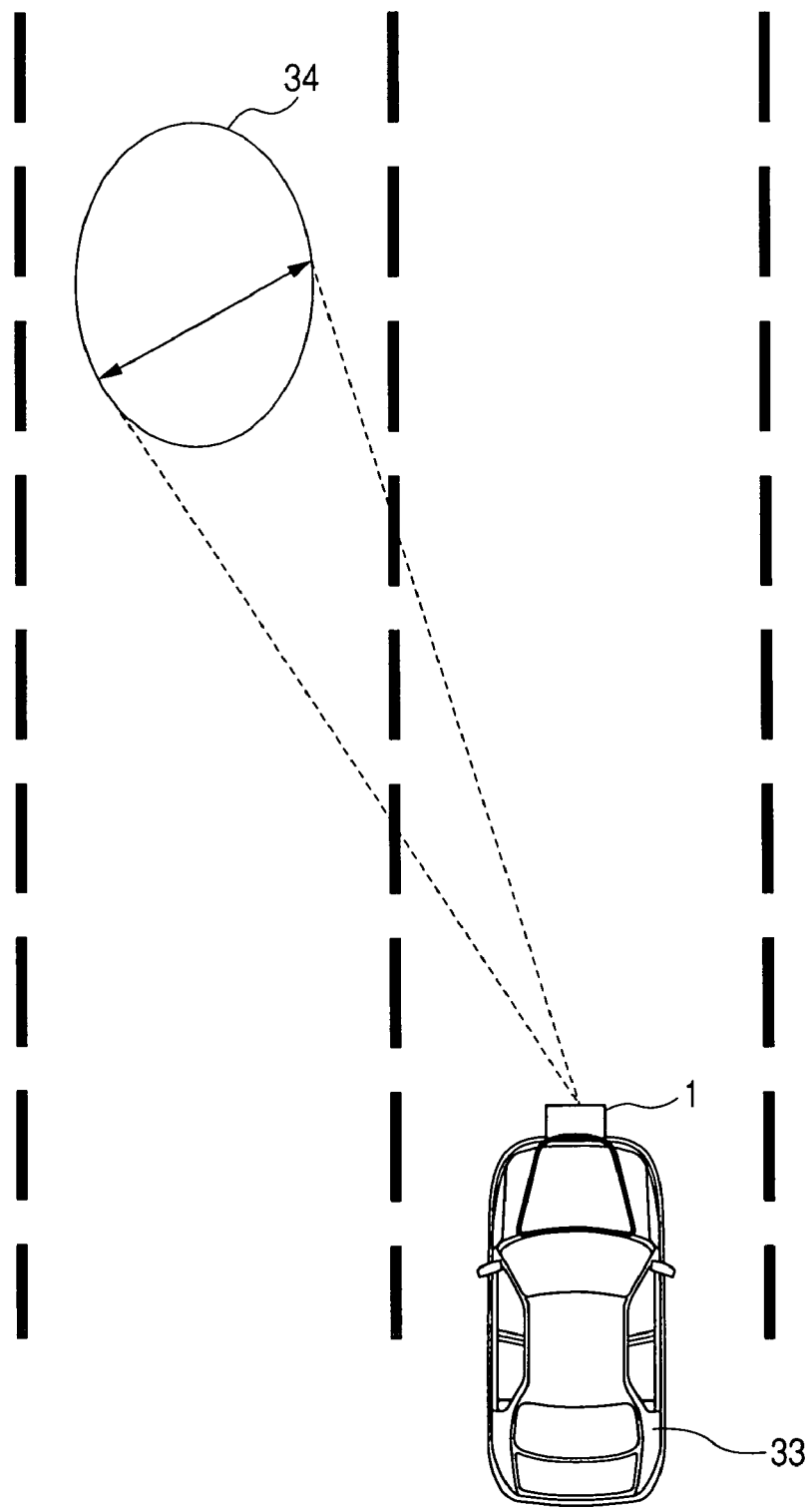
FIG. 14 is a diagram showing an example of mounting a surveillance radar of the present invention at the front of an automobile.

FIG. 14 is a diagram showing an example of using a surveillance radar apparatus of the present invention by mounting the same at the front of an automobile.

Figure 15:
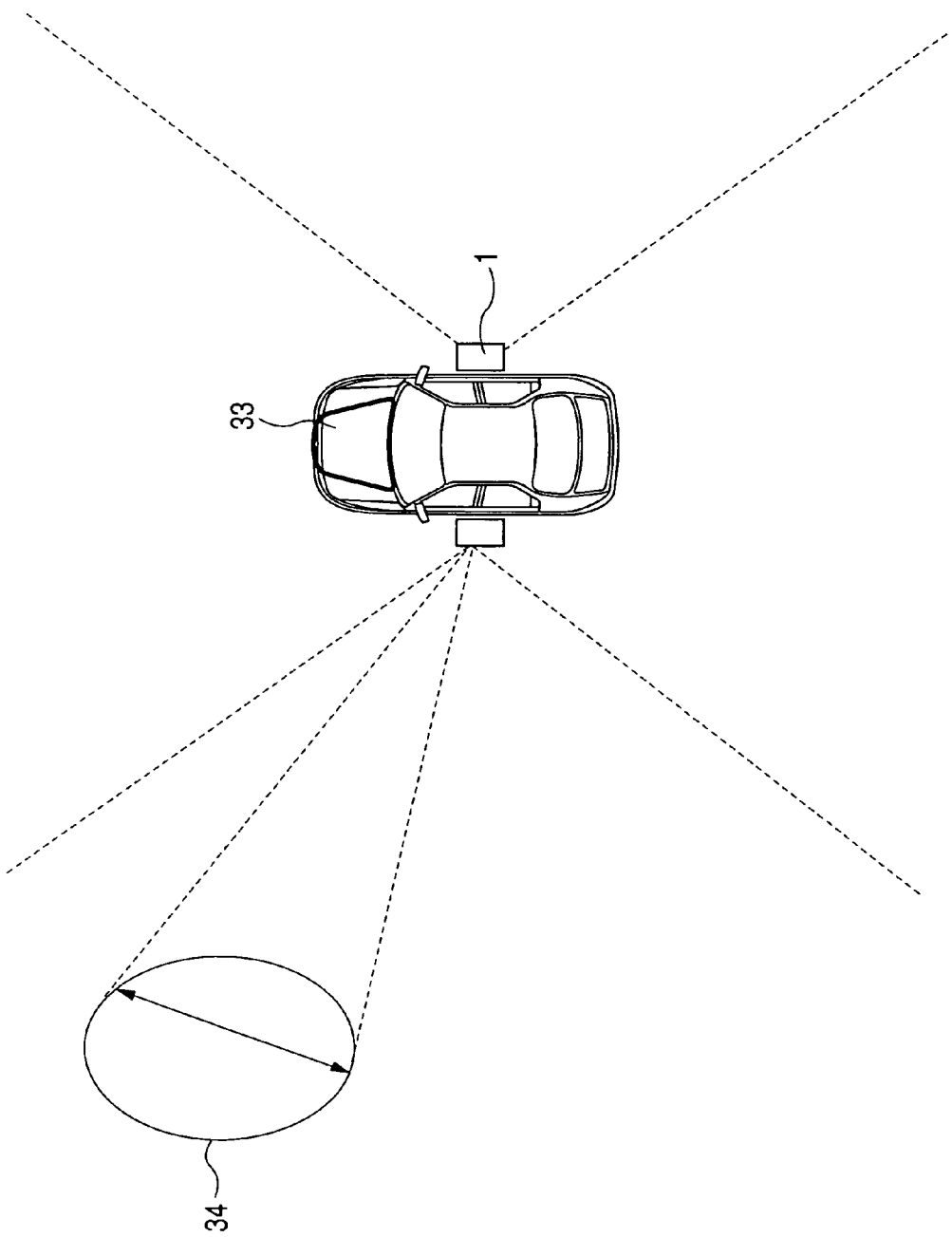
FIG. 15 is a diagram showing an example of mounting a surveillance radar of the present invention at each side of an automobile.

FIG. 15 is a diagram showing an example of using a surveillance radar apparatus of the present invention by mounting the same at both sides of an automobile.

Figure 16:
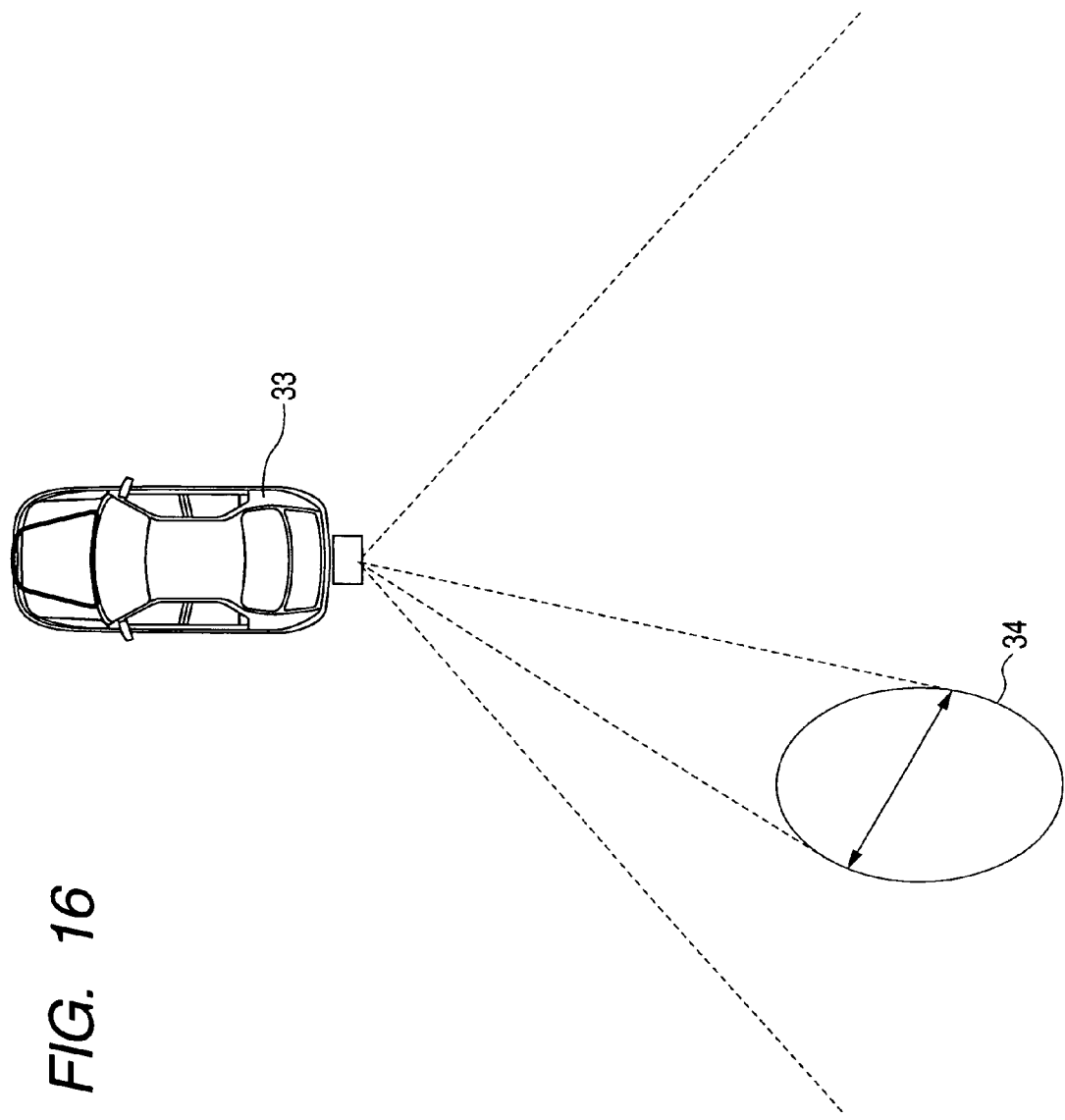
FIG. 16 is a diagram showing an example of mounting a surveillance radar at the back of an automobile.

FIG. 16 is a diagram showing an example of using a surveillance radar apparatus of the present invention by mounting the same at the back of an automobile.

In this embodiment, the position and width of an object 34 located in front of the automobile is measured by a surveillance radar apparatus 1, and the measurement values are input to the detected object identify unit 23. The detected object identify unit 23 judges that the detected object is an automobile if the azimuthal width of a detected object is within the possible values for an automobile, for example between 1.5 m and 3 m.

Moreover, it is determined whether or not the detected object 34 will hit the automobile if the automobile keeps traveling without stopping or changing the lane, by using, for example, the following procedure.

First, a straight line running at the center of the automobile and parallel to the traveling direction is imagined, and the positional relationship between the line and the object 34 is examined. When the distance from the object 34 to the line, output from the positional correction unit 21, is L, the width of the object 34 output from the width correction unit 20 is $W_t$, and the width of the automobile is $L_{car}$, if the following equation 11 is satisfied then it is determined that the object 34 and the automobile will collide with each other soon.

$$L<(W_t+L_{car})/2 \quad (11)$$

Also, if it is determined that the object and the automobile will collide with each other, an action is taken, such as, an alarm is given to the driver through the alarm device 14.

A surveillance radar apparatus installed in the vicinity of a door of the automobile 33 to monitor the side of the automobile as shown in FIG. 15, or one installed in the vicinity of the trunk to monitor the back of the automobile can have the same effect.

A surveillance radar apparatus of this embodiment can be mounted on a vehicle, in which case it is possible to accurately judge whether or not a detected object will block a traveling vehicle on which a radar apparatus is mounted, or whether or not the detected object will collide with the vehicle, and thus an accident can be prevented.

What is claimed is:

1. A radar apparatus that transmits a radiowave toward a monitoring area and receives a reflected wave from a moving object, detects said moving object based on said reflected wave, and determines a position of a reflection point on said detected moving object, said radar apparatus comprising:

a detected object measuring unit configured to determine positions of a plurality of reflection points on said moving object; and a width calculating unit configures to calculate a spatial width of said moving object based on distribution of measured positions, wherein said plurality of reflection points for determining the position are selected based on values of a plurality of Doppler frequencies developed due to a difference in relative velocity to said radar apparatus for each reflection point on a detected moving object.

2. The radar apparatus according to claim 1, further comprising a width calculating unit that calculates a scattering measure in an azimuthal direction of said determined plurality of reflection points, and calculates a spatial width in an azimuthal direction of the detected moving object.

3. The radar apparatus according to claim 2, wherein said width calculating unit further calculates a value obtained by multiplying a tangent of said scattering measure with a distance to the detected moving object, and further multiplying with a predetermined proportional coefficient, as the spatial with in the azimuthal direction of the detected moving object.

4. The radar apparatus according to claim 2, wherein said scattering measure is a standard deviation of the azimuthal positions of determined plurality of reflection points.

5. The radar apparatus according to claim 1, wherein said radar apparatus determines the azimuthal position of a reflection point on the detected moving object by means of monopulse angle measuring techniques.

6. The radar apparatus according to claim 1, further comprising a detected object identify unit that identifies a kind of said moving object based on the value calculated as the spatial width in the azimuthal direction of the detected moving object.

7. The radar apparatus according to claim 6, wherein said detected object identify unit judges that, when a value calculated as the spatial width in the azimuthal direction of the detected moving object is within a predetermined range, said moving object is a human.

8. The radar apparatus according to claim 6,
wherein said detected object identify unit judges that, when a value calculated as a spatial width in the azimuthal direction of the detected moving object is within a predetermined range, said moving object is a vehicle.

9. The radar apparatus according to claim 1,
wherein said radar apparatus is installed at a predetermined place inside or outside of a room,
wherein said radar apparatus further comprises a memory unit in which a monitoring area is pre-stored, and
wherein said radar apparatus detects a moving object within said monitoring area.

10. The radar apparatus according to claim 1,
wherein said radar apparatus is installed on a vehicle, and
wherein said radar apparatus further comprises a width calculating unit configured to calculate the width of a detected object.

11. The radar apparatus according to claim 1,
wherein said radar apparatus is installed on a vehicle, and
wherein said radar apparatus further comprises a detected object identify unit that judges whether or not said object blocks traveling of said vehicle, based on positional and spatial width information on a detected object.

12. The radar apparatus according to claim 1,
wherein said detected object measuring unit measures a distance to and an azimuth of a plurality of reflection points on the detected moving object.

13. The radar apparatus according to claim 1, further comprising:
a memory unit configured to store a value calculated as the spatial width in the azimuthal direction of the detected moving object; and
a width correction unit that corrects the value of said spatial width of said moving object based on information stored in a memory unit,
wherein said width correction unit, when the value of a spatial width in the azimuthal direction of said moving object stored in said memory unit is different from a current value of the spatial width in the azimuthal direction calculated by said radar apparatus, corrects the value of the spatial width in the azimuthal direction based on the information stored in said memory unit.

14. The radar apparatus according to claim 1, further comprising a width correction unit that outputs information indicating that, when the detected moving object is located in a vicinity of a border between a detectable azimuthal area and an undetectable azimuthal area of said radar apparatus, a value output as the spatial width in the azimuthal direction is a lower limit value of a spatial width in the azimuthal direction of said moving object.

15. A radar apparatus that transmits a radiowave toward a monitoring area and receives a reflected wave from a moving object, detects said moving object based on said reflected wave, and determines a position of a reflection point on said detected moving object, said radar apparatus comprising:
a detected object measuring unit configured to determine positions of a plurality of reflection points on said moving object;
a width calculating unit configured to calculate a spatial width of said moving object based on distribution of measured positions; and
a width calculating unit that calculates a scattering measure in an azimuthal direction of said determined plurality of reflection points, and calculates a spatial width in an azimuthal direction of a detected moving object,
wherein said detected object measuring unit measures a distance to and an azimuth of a plurality of reflection points on the detected moving object, and
wherein said width calculating unit further calculates a value obtained by multiplying a tangent of said scattering measure with a distance to the detected moving object, and further multiplying with a predetermined proportional coefficient, as the spatial with in the azimuthal direction of the detected moving object.

16. A radar apparatus that transmits a radiowave toward a monitoring area and receives a reflected wave from a moving object, detects said moving object based on said reflected wave, and determines a position of a reflection point on said detected moving object, said radar apparatus comprising:
a detected object measuring unit configured to determine positions of a plurality of reflection points on said moving object;
a width calculating unit configured to calculate a spatial width of said moving object based on distribution of measured positions; and
a width calculating unit that calculates a scattering measure in an azimuthal direction of said determined plurality of reflection points, and calculates a spatial width in an azimuthal direction of a detected moving object,
wherein said detected object measuring unit measures a distance to and an azimuth of a plurality of reflection points on the detected moving object, and
wherein said scattering measure is a standard deviation of the azimuthal positions of determined plurality of reflection points.

17. A radar apparatus that transmits a radiowave toward a monitoring area and receives a reflected wave from a moving object, detects said moving object based on said reflected wave, and determines a position of a reflection point on said detected moving object, said radar apparatus comprising:
a detected object measuring unit configured to determine positions of a plurality of reflection points on said moving object;
a width calculating unit configured to calculate a spatial width of said moving object based on distribution of measured positions;
a memory unit configured to store a value calculated as a spatial width in an azimuthal direction of a detected moving object;
a width correction unit that corrects the value of said spatial width of said moving object based on the information stored in a memory unit,
wherein said detected object measuring unit measures a distance to and an azimuth of the plurality of reflection points on the detected moving object, and
wherein said width correction unit, when the value of a spatial width in the azimuthal direction of said moving object stored in said memory unit is different from a current value of a spatial width in the azimuthal direction calculated by said radar apparatus, corrects the value of a spatial width in the azimuthal direction, based on the information stored in said memory unit.

18. A radar apparatus that transmits a radiowave toward a monitoring area and receives a reflected wave from a moving object, detects said moving object based on said reflected wave, and determines a position of a reflection point on said detected moving object, said radar apparatus comprising:
a detected object measuring unit configured to determine positions of a plurality of reflection points on said moving object;

a width calculating unit to calculate a spatial width of said moving object based on distribution of measured positions; and a width correction unit that outputs information indicating that, when a detected moving object is located in a vicinity of a border between a detectable azimuthal area and an undetectable azimuthal area of said radar apparatus, a value output as a spatial width in an azimuthal direction is a lower limit value of a spatial width in an azimuthal direction of said moving object, wherein said detected object measuring unit measures a distance to and an azimuth of a plurality of reflection points on the detected moving object.

19. A radar apparatus that radiates a wave toward a monitoring area and receives the reflected wave from a moving object, detects said moving object based on the reflected wave, and determines a position of a reflection point on said detected moving object, said radar apparatus comprising:

an analogue circuit having a transmitting antenna and a receiving antenna and outputting a signal that has been converted to a digital signal by an A/D converter; and a signal processing unit that process the signal from said analogue circuit, wherein said signal processing unit includes:

an FFT processing unit that performs an FFT processing on an input signal;

a peak extraction unit that extracts signal power peaks from a frequency spectrum based on a signal-to-noise ratio;

a detected object measuring unit that calculates a distant from the radar apparatus and an azimuth of the position of the reflection point on said moving object; and a width calculating unit that calculates a spatial width of said moving object from the distance from the radar apparatus and the azimuth of the position of a reflection point on a moving object to be input from said detected object measuring unit.

20. The radar apparatus according to claim 19, wherein said signal processing unit further includes:

a memory unit that stores a signal-to-noise ratio which is a threshold level for extracting a signal power peak on a frequency spectrum;

a positional correction unit that corrects a position calculated by said detected object measuring unit based on past measurement information stored in said memory unit; and a width correction unit that corrects a width calculated by said width calculating unit based on the past measurement information stored in said memory unit.

21. The radar apparatus according to claim 19, wherein said signal processing unit further includes a detected object identify unit that identifies a kind of said moving object based on the moving velocity, distance, azimuthal position, and width in the azimuthal direction of said moving object.

22. The radar apparatus according to claim 19, wherein measuring of the distance to the reflection point on said moving object is performed by a two-frequency CW modulation technique.

* * * * *